US008459560B1

(12) United States Patent
Mineo-Goggin (10) Patent No.: US 8,459,560 B1
(45) Date of Patent: Jun. 11, 2013

(54) CONVERTING DIGITAL WALLET CREDENTIAL FROM DISPLAYED CODE INTO AUDIO CODE (75) Inventor: Jason David Mineo-Goggin, Chelsea, MA (US)

(73) Assignee: Intuit Inc., Mountain View, CA (US)

( * ) Notice: Subject to any disclaimer, the term of this patent is extended or adjusted under 35 U.S.C. 154(b) by 24 days.

(21) Appl. No.: 13/306,795

(22) Filed: Nov. 29, 2011

(51) Int. Cl.
G02B 5/32 (2006.01)
G06Q 20/32 (2006.01)

(52) U.S. Cl.
CPC *G02B 5/32* (2013.01); *G06Q 20/32* (2013.01); *G06Q 20/322* (2013.01)
USPC .......................................... 235/487; 235/494

(58) Field of Classification Search
USPC ................................................. 235/487, 494
See application file for complete search history.

(56) References Cited

U.S. PATENT DOCUMENTS 5,905,250 A * 5/1999 Fukuda et al. ........... 235/472.01
2012/0025950 A1* 2/2012 Von Tippelskirch et al. ............................ 340/5.74

FOREIGN PATENT DOCUMENTS

WO WO 2009060004 A1 * 5/2009

OTHER PUBLICATIONS

Needleman, R., "Naratte: Mobile Payments Using Sound Waves," http://news.cnet.com/8301-19882_3-20072295-250/naratte-mobile-payments-using-sound-waves/, Jun. 19, 2011 (2 pages).

* cited by examiner

Primary Examiner — Thien M Le
Assistant Examiner — Christopher Stanford
(74) Attorney, Agent, or Firm — Osha Liang LLP (57) ABSTRACT A method to submit a payment using a mobile device, including receiving, from a user of the mobile device, input to change a first code to a second code, where the first code includes a payment account number stored in the mobile device, obtaining, in response to the input of the user, the first code from a first output buffer storing data for transmission in a first transmission mode, converting the first code stored in the first output buffer into the second code, storing the second code in a second output buffer for transmission in a second transmission mode, and transmitting the second code to the POS device in the second transmission mode, wherein the payment account number is extracted from the second code by the POS device for completing the payment.

24 Claims, 4 Drawing Sheets

CONVERTING DIGITAL WALLET CREDENTIAL FROM DISPLAYED CODE INTO AUDIO CODE

BACKGROUND

The term "digital wallet" is increasingly being used to describe mobile phones, especially smartphones that store an individual's credentials and utilize wireless technologies such as near field communication (NFC) to carry out financial transactions. Such credentials may include information regarding the individual's bank account, credit card, driver's license, health card, loyalty card, and other ID documents. When making a purchase using the digital wallet, the credentials can be passed to a merchant's terminal wirelessly via NFC.

A barcode is an optical machine-readable representation of data in various formats including binary data, alphanumeric data, Kanji symbols, etc. A one dimensional (1D) barcode represents data by varying the widths and spacing of parallel line segments. A two dimensional (2D) barcode may use rectangles, dots, hexagons, and/or other geometric patterns in 2 dimensions instead of the parallel line segments. A QR code (i.e., Quick Response code) is a type of 2D barcode that typically consists of black modules arranged in a square pattern on a white background. Barcodes may be scanned by special optical scanners referred to as barcode readers.

Point-of-sale (POS) systems are beginning to be set up around the scanning of barcodes from a consumer's mobile device screen. The barcodes represent the payment information stored in a digital wallet installed on the consumer's mobile device. When the consumer makes a purchase, the payment information is retrieved by the POS system to complete the sales transaction. Typically, a POS system accepts only a single format of payment information, such as magnetic strip on a credit card, NFC transmission from a digital wallet, or optical scanning from the barcode displayed on a smartphone.

SUMMARY

In general, in one aspect, the invention relates to a method to submit a payment using a mobile device. The method includes receiving, from a user of the mobile device, input to change a first code to a second code, wherein the first code comprises a payment account number stored in the mobile device, obtaining, using a processor of the mobile device and in response to the input of the user, the first code from a first output buffer of the mobile device, wherein the first output buffer stores data for transmission in a first transmission mode, converting, using the processor, the first code stored in the first output buffer into the second code, storing the second code in a second output buffer of the mobile device, wherein the second output buffer stores data for transmission in a second transmission mode, and transmitting, in response to storing the second code in the second output buffer, the second code to the POS device in the second transmission mode, wherein the payment account number is extracted from the second code by the POS device for completing the payment.

In general, in one aspect, the invention relates to a mobile device configured to submit a payment. The mobile device includes a repository configured to store a payment account number of a user of the mobile device, a first output buffer configured to store data for transmission in a first transmission mode, a second output buffer configured to store data for transmission in a second transmission mode, a processor connected to the repository, the first output buffer, and the second output buffer, a digital wallet application executing on the processor and configured to retrieve, from the repository, the payment account number for converting into a first code to be stored in the first output buffer, wherein transmission capability of the digital wallet application for submitting the payment is limited to transmitting the first code in the first transmission mode, and a plug-in software module coupled to the digital wallet application and configured to receive, from the user, input to change a first code to a second code, convert, in response to the input of the user, the first code stored in the first output buffer into the second code for storing in the second output buffer, and submit, in response to storing the second code in the second output buffer, the payment by transmitting the second code to a point of sale (POS) device in the second transmission mode.

In general, in one aspect, the invention relates to a non-transitory computer readable medium storing instructions to submit a payment. The instructions when executed by a computer comprising functionality for receiving, from a user of the mobile device, input to change a first code to a second code, wherein the first code comprises a payment account number stored in the mobile device, obtaining, in response to the input of the user, the first code from a first output buffer of the mobile device, wherein the first output buffer stores data for transmission in a first transmission mode, converting the first code stored in the first output buffer into the second code, storing the second code in a second output buffer of the mobile device, wherein the second output buffer stores data for transmission in a second transmission mode, and transmitting, in response to storing the second code in the second output buffer, the second code to the POS device in the second transmission mode, wherein the payment account number is extracted from the second code by the POS device for completing the payment.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As noted above, some POS systems are beginning to be set up around the scanning of barcodes from a consumer's mobile device screen while others may be based on transmitting the consumer credential stored in a consumer's mobile device to a receiving station via NFC functionality. Instead of the displayed barcode or transmitted NFC data, a variation of such set up may be based on audio code where the receiving station is equipped to receive audio signal transmission. Embodiments of the invention provide functionalities built into the mobile device that translate among displayed barcode, audio code, and NFC code, such that a single consumer mobile device may cooperate with multiple types of POS systems. Another use for such a mechanism is as a form of security whereby two or more of the visible code, audio code, and NFC code are utilized in a redundant manner to verify the source and validity of the consumer credential before completing the POS transaction.

Figure 1:
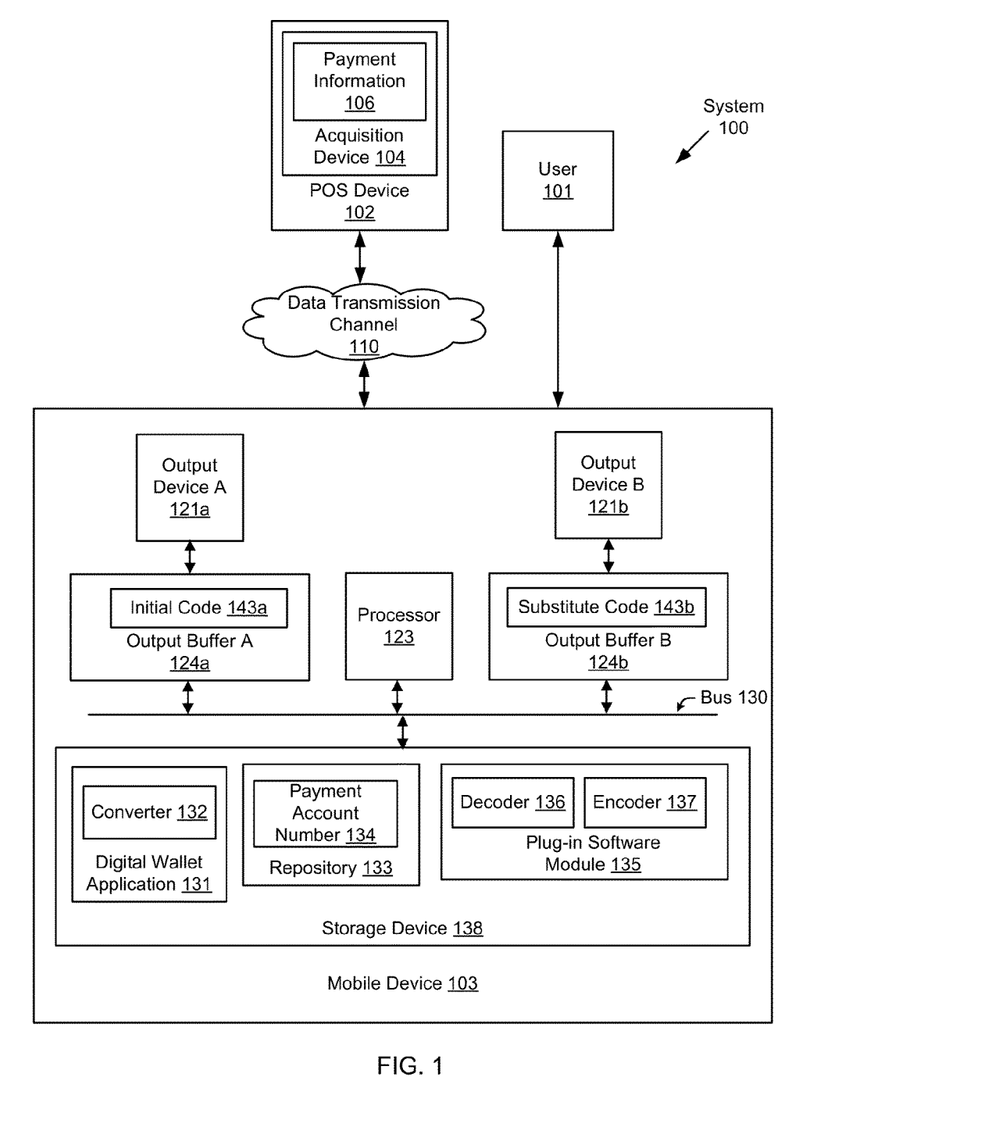
FIG. 1 shows a schematic diagram of a system of converting digital wallet credential in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes a POS device (102) communicatively coupled to a mobile device (103) of a user (101) via data transmission channel (110). For example, the data transmission channel (110) may be configured for data transmission using optical scanning, NFC signal, audio signal, etc. Further, the POS device (102) includes an acquisition device (104) for acquiring data (e.g., payment information (106)) via the data transmission channel (110). The mobile device (103) may be any portable computing device, such as a smartphone. In one or more embodiments, the mobile device (103) includes processor (123), output buffer A (124a) coupled to output device A (121a), output buffer B (124b) coupled to output device B (121b), and storage device (138). These various elements are coupled via a bus (130) in the mobile device (103). The storage device (138) further includes a repository (133) used for storing payment account information (e.g., payment account number (134)) of the user (101). The bus (130) may be a microprocessor based system bus known to those skilled in the art. In one or more embodiments, the processor (123) is configured to execute a digital wallet application (131) and plug-in software module (135) that are stored in the storage device (138). The digital wallet application (131) and plug-in software module (135) may be separate software applications installed onto the mobile device (103). Alternatively, the digital wallet application (131) and plug-in software module (135) may be within one integrated software application. The storage device (138) may be a memory, any other suitable medium for storing data, or any suitable combination thereof.

In one or more embodiments, the output buffer A (124a) is configured to store data (e.g., initial code (143a)) for transmission in a first transmission mode. For example, the output buffer A (124a) may be a display buffer where the output device A (121a) is a display screen of which the displayed image pattern is modulated based on image data stored in the display buffer. In one or more embodiments, the display screen displays an image representing the initial code (143a) to transmit to the POS device (102) in the first transmission mode. Specifically, the first transmission mode is the optical scanning of the displayed image using a barcode scanner (i.e., acquisition device (104)) of the POS device (102).

In another example, the output buffer A (124a) may be an audio buffer where the output device A (121a) is an audio transducer (e.g., a speaker) of which the generated audio signal pattern is modulated based on audio data stored in the audio buffer. In one or more embodiments, the audio transducer generates an audio signal representing the initial code (143a) to transmit to the POS device (102) in the first transmission mode. Specifically, the first transmission mode is the reception of the audio signal using an audio receiver (i.e., acquisition device (104)) of the POS device (102).

In yet another example, the output buffer A (124a) may be an NFC data buffer where the output device A (121a) is an NFC transducer of which the generated NFC signal pattern is modulated based on NFC data stored in the NFC data buffer. In one or more embodiments, the NFC transducer generates an NFC signal representing the initial code (143a) to transmit to the POS device (102) in the first transmission mode. Specifically, the first transmission mode is the reception of the NFC signal using an NFC receiver (i.e., acquisition device (104)) of the POS device (102).

Similarly, the output buffer B (124b) and the output device B (121b) may be a display buffer and display screen, an audio buffer and audio transducer, or an NFC data buffer and NFC transducer that are different types than those of the output buffer A (124a) and the output device A (121a). Although two sets of output buffer and output device combinations are shown in FIG. 1, more than two sets may also be included for enhanced compatibility with more types of POS devices.

In one or more embodiments, the digital wallet application (131) executes on the processor (123) and is configured to retrieve, from the repository (133), the payment account number (134) for converting into the initial code (143a) to be stored in the output buffer A (124a). For example, the payment account number (134) is converted using the converter (132) of the digital wallet application (131) into the initial code (143a). In particular, the transmission capability of the digital wallet application (131) for submitting payment information to the POS device (102) is limited to transmitting the initial code (143a) using the first transmission mode of the output device A (121a).

In one or more embodiments, the digital wallet application (131) is further configured to receive an indication regarding whether the POS device (102) is compatible with the first transmission mode. For example, such indication may be an input from the user (101) based on a posted sign on the POS device (102) or an instruction of a retail staff operating the POS device (102). In another example, such indication may be a time out condition in response to an attempt by the mobile device (103) to transmit payment information using the first transmission mode. When the indication indicates that the POS device (102) is compatible with the first transmission mode, the digital wallet application (131) proceeds to transmit the payment information to the POS device (102). In particular, the transmitted payment information is received by the acquisition device (104) as the payment information (106) that is used by the POS device (102) to complete the purchase for the user (101).

When the indication indicates that the POS device (102) is not compatible with the first transmission mode, the digital wallet application (131) may provide a message to the user (101) reporting such a compatibility issue. Accordingly, the user (101) may invoke the plug-in software module (135) to work around such a compatibility issue by changing the initial code (143a) to a substitute code (143b). In another scenario, the digital wallet application (131) may automatically invoke the plug-in software module (135) when the indication indicates that the POS device (102) is not compatible with the first transmission mode.

When invoked, the plug-in software module (135) is configured to receive, from the digital wallet application (131), an address in the output buffer A (124a) to obtain the initial code A (143a). Accordingly, the initial code A (143a) stored in the output buffer A (124a) is converted into the substitute code B (143b) for storing in the output buffer B (124b). In one or more embodiments, the initial code A (143a) is converted into the substitute code B (143b) using the decoder (136) and the encoder (137) of the plug-in software module (135). For example, the decoder (136) may decode the initial code (143a) in a first encoding format to generate an extracted payment account number representing the original payment account number (134). Such extracted payment account number is then encoded by the encoder (137) into the substitute code (143b) using a second encoding format. In another example, the decoder (136) and the encoder (137) may be an integrated codec that converts the payment information from the first encoding format of the initial code (143a) directly into the second encoding format of the substitute code (143b). As described above, each of the first encoding format and the second encoding format may be a display image data format for modulating a displayed image pattern on a display screen, an audio data format for modulating an audio transducer to generate an audio signal, or an NFC data format for modulating an NFC transducer to generate an NFC signal. In one or more embodiments, the decoder (136) and the encoder (137) are configured with the functionality to decode and encode such display image data format, audio data format, and/or NFC data format suitable for storing in the output buffers and modulating the output devices.

In one or more embodiments, the digital wallet application (131) is configured to support only barcode format of payment information. Said in other words, the initial code (143a) is barcode image data and the first transmission mode is the optical scanning of the barcode. When the mobile device (103), installed with such digital wallet application (131), is used with the POS device (102) that is not equipped with any optical scanner, the barcode image data (i.e., the initial code (143a)) generated by the digital wallet application (131) for optical scanning may be changed into a second transmission format (e.g., an audio tone representation or an NFC representation) of the payment account number (134). As described above, such conversion may be manually or automatically invoked. Accordingly, the plug-in software module (135) submits the payment information to the POS device (102) by transmitting the substitute code (143b) using the second transmission mode (e.g., audio transmission or NFC transmission that the POS device (102) is compatible with).

In one or more embodiments, the digital wallet application (131) is configured to support only the NFC format of payment information. Said in other words, the initial code (143a) is NFC data and the first transmission mode is the NFC transmission. When the mobile device (103) installed with such digital wallet application (131) is used with the POS device (102) that is not equipped with any NFC receiver, the NFC signal data (i.e., the initial code (143a)) generated by the digital wallet application (131) for transmission may be changed into a second transmission format (e.g., an audio tone representation or a barcode representation) of the payment account number (134). As described above, such conversion may be manually or automatically invoked. Accordingly, the plug-in software module (135) submits the payment information to the POS device (102) by transmitting the substitute code (143b) using the second transmission mode (e.g., audio transmission or barcode scanning that the POS device (102) is compatible with).

In one or more embodiments, the digital wallet application (131) is configured to support only the audio format of payment information. Said in other words, the initial code (143a) is audio data and the first transmission mode is the audio transmission. When the mobile device (103) installed with such digital wallet application (131) is used with the POS device (102) that is not equipped with any audio receiver, the audio signal data (i.e., the initial code (143a)) generated by the digital wallet application (131) for transmission may be changed into a second transmission format (e.g., a barcode representation or an NFC representation) of the payment account number (134). As described above, such conversion may be manually or automatically invoked. Accordingly, the plug-in software module (135) submits the payment information to the POS device (102) by transmitting the substitute code (143b) using the second transmission mode (e.g., barcode scanning or NFC transmission that the POS device (102) is compatible with).

Figure 2:
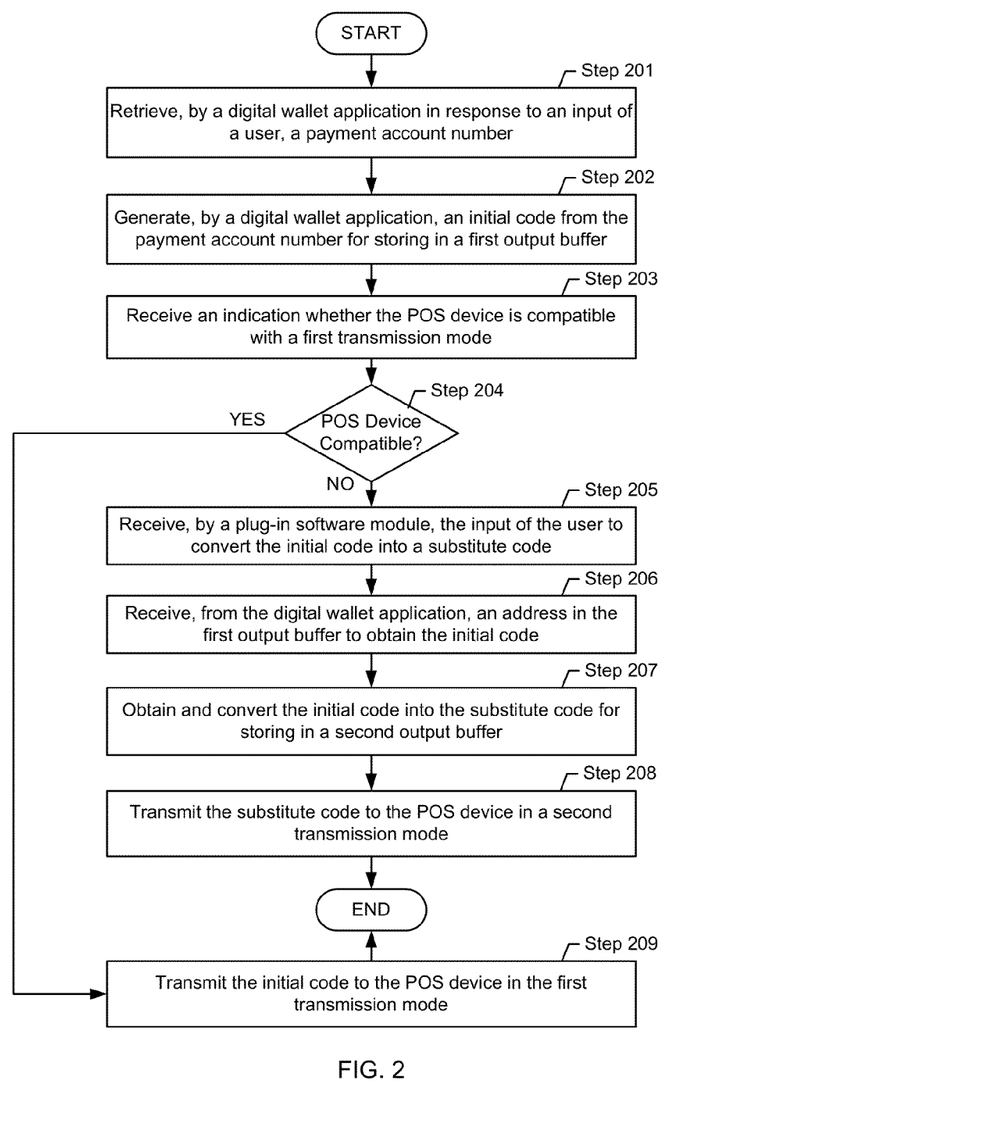
FIG. 2 shows a flowchart of a method of converting digital wallet credential in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, a payment account number is retrieved by a digital wallet application from a repository of a mobile device (e.g., a smartphone). For example, the payment account number was stored in the digital wallet for use with POS devices equipped with functionality to automatically receive such payment account information to complete sales transactions. In one or more embodiments, each POS device is equipped with an optical scanner, an audio receiver, or an NFC receiver to receive the payment account information using optical scanning, audio communication, or NFC communication.

In Step 202, an initial code is generated by the digital wallet application from the payment account number. For example, the initial code may be barcode image data, audio signal data, or NFC signal data that is suitable for modulating a display screen, an audio transducer (e.g., speaker), or an NFC transducer to produce a displayed barcode image, an audio signal, or an NFC signal. In one or more embodiments, such initial code is stored in a first output buffer, such as a display buffer, an audio data buffer, or an NFC data buffer. In one or more embodiments, transmission capability of the digital wallet application for submitting the payment is limited to transmitting the initial code in a first transmission mode, such as one of optical scanning, audio transmission, and NFC transmission.

In Step 203, an indication whether the POS device is compatible with the first transmission mode is received by the digital wallet application. For example, such indication may be an input from a user of the mobile device based on a posted sign on the POS device or an instruction of a retail staff operating the POS device. In another example, such indication may be a time out condition in response to an attempt by the mobile device to transmit payment information using the first transmission mode.

In Step 204, if the indication indicates that the POS device is compatible with the first transmission mode, the method proceeds to Step 209 where the digital wallet application transmits the initial code as the payment information to the POS device to complete the purchase for the user.

In Step 204, if the indication indicates that the POS device is not compatible with the first transmission mode, the method proceeds to Step 205 where the user invokes a plug-in software module to work around such compatibility issue by changing the initial code to a substitute code. For example, the digital wallet application may provide a message to the user reporting such compatibility issue and prompting the user to invoke the plug-in software module. In another scenario, the digital wallet application may automatically invoke the plug-in software without user intervention.

In Step 206, the plug-in software module, once invoked, receives from the digital wallet application an address in the first output buffer to obtain the initial code. In Step 207, the initial code is obtained and converted into a substitute code for storing in a second output buffer. In one or more embodiments, each of the initial code and the substitute code may be in a display image data format for modulating a displayed image pattern on a display screen, an audio data format for modulating an audio transducer to generate an audio signal, or an NFC data format for modulating an NFC transducer to generate an NFC signal. In one or more embodiments, the conversion from the initial code to the substitute code is based on functionality to decode and encode such display image data format, audio data format, and/or NFC data format suitable for storing in the output buffers and modulating the output devices.

In Step 208, the substitute code is transmitted to the POS device in a second transmission mode, such as one of barcode scanning, audio signal transmission, or NFC data transmission that the POS device is compatible with.

Figure 3A:
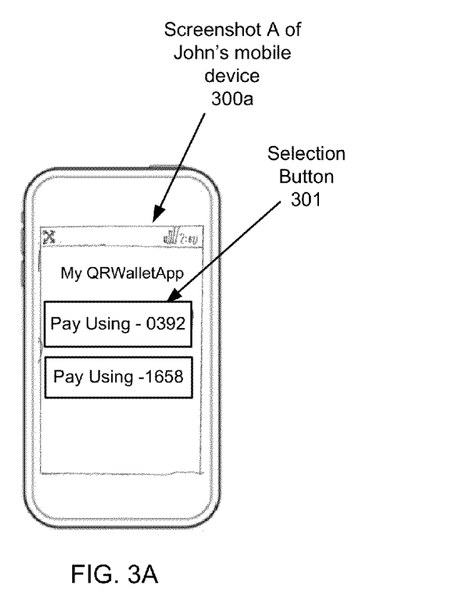
FIGS. 3A-3C show an example of converting digital wallet credential in accordance in accordance with one or more embodiments of the invention.
Figure 3B:
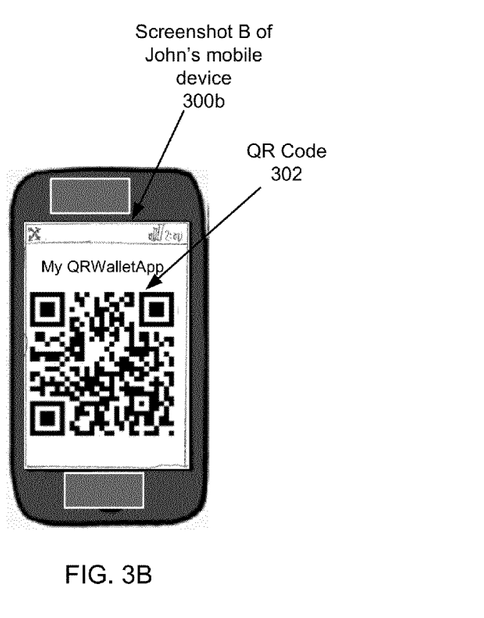
Figure 3C:
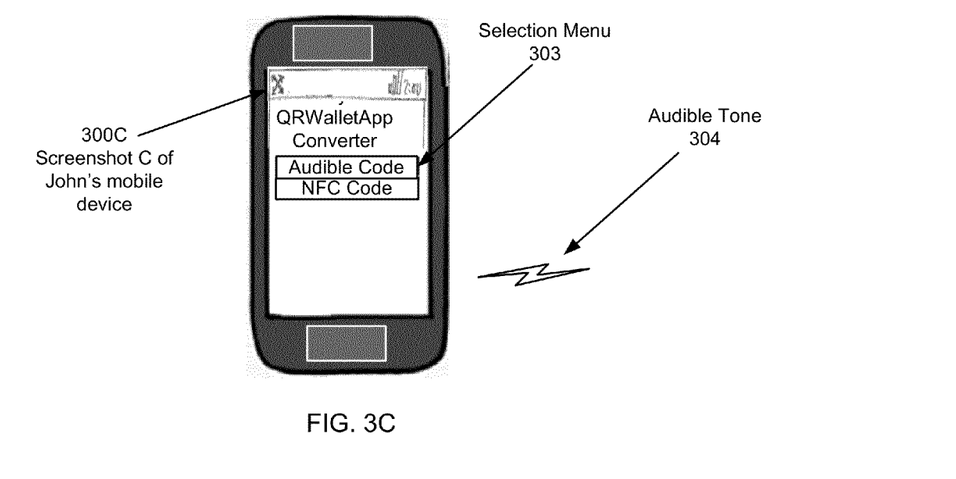

FIGS. 3A-3C show an application example in accordance with one or more embodiments of the invention. This example application may be practiced using the system (100) of FIG. 1 and based on the method described with respect to FIG. 2 above.

The example depicted in FIGS. 3A-3C is based on a shopper John who brings an item to a clerk at a POS station where a transaction is created. John is asked to remit payment and opens up his digital wallet on his mobile device to show a selection menu of different payment account numbers. FIG. 3A shows the screenshot A (300a) of John's mobile device where various payment account numbers stored in the digital wallet are displayed in the selection menu. In particular, John selected the payment account number ending in 0392 by clicking on the selection button (301). Upon clicking the selection button (301), the digital wallet displays QR code (302) on John's mobile device as shown in FIG. 3B as the screenshot B (300b). At this point, the clerk informs John that they only accept audio codes and the QR code is not accepted by the POS station. John interacts with his mobile device to activate "My QRWallet App Converter" to transform the QR code into an audio format capable of being used with the store's POS system. FIG. 3C shows the screenshot C (300c) on John's mobile device where the selection menu (303) allows John to choose either an audible format or an NFC format for the conversion. Based on the requirement of the particular POS system indicated by the clerk, John selects the audio format to send the payment account number using the audible tone (304) and the transaction is completed. In another example when the clerk informs John that only NFC codes are accepted by the POS station, John may activate "My QRWallet App Converter" to transform the QR code into a NFC format where audible tone (304) may be replaced by a NFC signal to communicate with the store's POS system.

Figure 4:
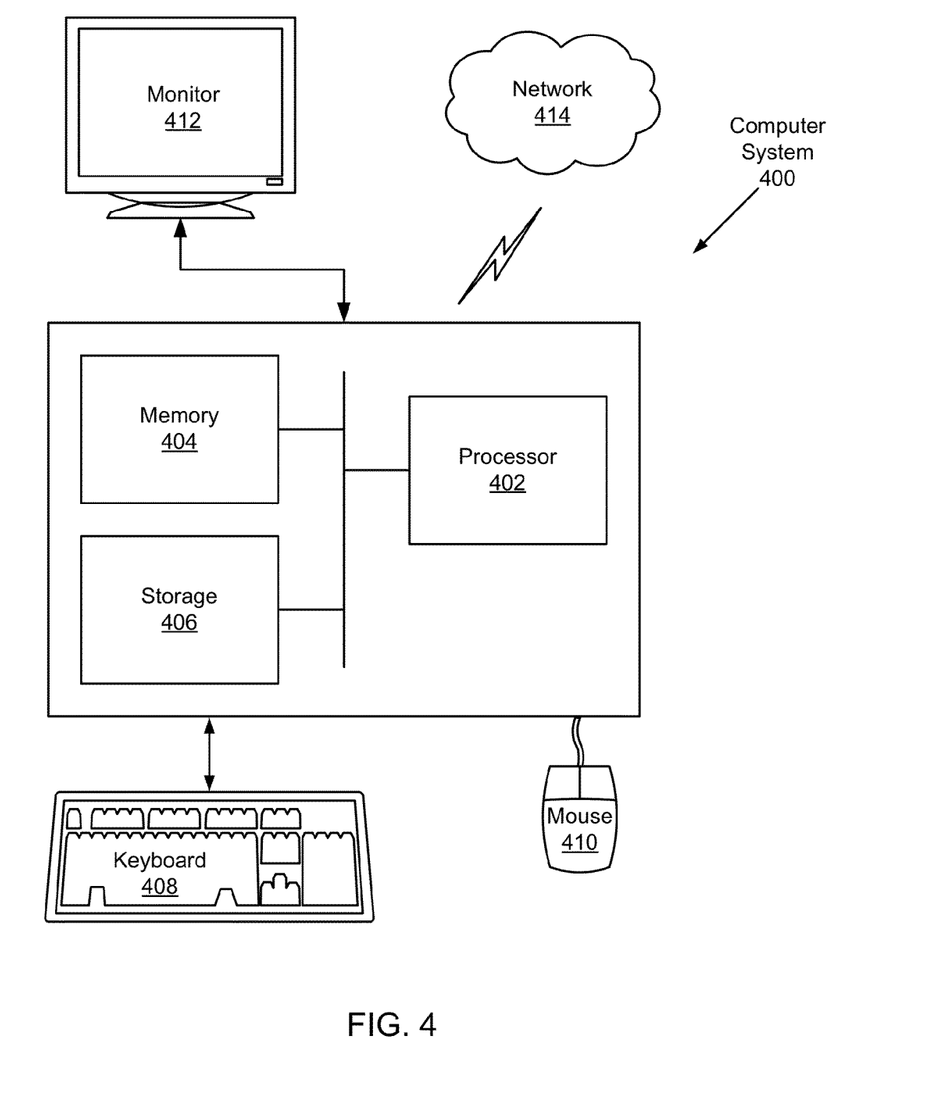
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention. For example, the computer system (400) may be a desktop computer, a laptop computer, a tablet computer, a smartphone, etc.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to submit a payment using a mobile device, comprising:

receiving, from a user of the mobile device, input to change a first code to a second code, wherein the first code comprises a payment account number stored in the mobile device;

obtaining, using a processor of the mobile device and in response to the input of the user, the first code from a first output buffer of the mobile device, wherein the first output buffer stores data for transmission in a first transmission mode;

converting, using the processor, the first code stored in the first output buffer into the second code;

storing the second code in a second output buffer of the mobile device, wherein the second output buffer stores data for transmission in a second transmission mode; and transmitting, in response to storing the second code in the second output buffer, the second code to the POS device in the second transmission mode, wherein the payment account number is extracted from the second code by the POS device for completing the payment;

retrieving, by a digital wallet application executing on the processor, the payment account number from a repository of the mobile device for converting to the first code, wherein transmission capability of the digital wallet application for submitting the payment is limited to transmitting the first code in the first transmission mode, wherein the second code is stored in the second output buffer and transmitted to the POS device in response to a plug-in module converting the first code into the second code.

2. The method of claim 1, wherein converting the first code into the second code comprises:

decoding the first code in a first encoding format to generate an extracted payment account number; and encoding the extracted payment account number using a second encoding format of the second code.

3. The method of claim 1, wherein converting the first code into the second code comprises:

converting the payment account number from a first encoding format of the first code directly into a second encoding format of the second code.

4. The method of claim 1, further comprising:

receiving, by the digital wallet application, an indication whether the POS device is compatible with the first transmission mode; and receiving, by the plug-in module from the digital wallet application, an address in the first output buffer to obtain the first code when the indication indicates that the POS device is incompatible with the first transmission mode.

5. The method of claim 1, wherein transmitting the second code to the POS device in the second transmission mode comprises:

displaying the second code as a bar code on a display screen of the mobile device, wherein the first code comprises one of an audio tone representation of the payment account number and a near field communication representation of the payment account number.

6. The method of claim 1, wherein transmitting the second code to the POS device in the second transmission mode comprises:

transmitting the second code as an audio tone representation of a bar code using a audio transducer of the mobile device, wherein the first code comprises one of the bar code and a near field communication representation of the payment account number.

7. The method of claim 1, wherein transmitting the second code to the POS device in the second transmission mode comprises:

transmitting the second code as a near field communication (NFC) representation of a bar code using an NFC transducer of the mobile device, wherein the first code comprises one of the bar code and an audio tone representation of the payment account number.

8. The method of claim 1, wherein the mobile device is a smartphone.

9. A mobile device configured to submit a payment, the mobile device comprising:

a repository configured to store a payment account number of a user of the mobile device;

a first output buffer configured to store data for transmission in a first transmission mode;

a second output buffer configured to store data for transmission in a second transmission mode;

a processor connected to the repository, the first output buffer, and the second output buffer;

a digital wallet application executing on the processor and configured to:

retrieve, from the repository, the payment account number for converting into a first code to be stored in the first output buffer, wherein transmission capability of the digital wallet application for submitting the payment is limited to transmitting the first code in the first transmission mode; and a plug-in software module coupled to the digital wallet application and configured to:

receive, from the user, input to change a first code to a second code;

convert, in response to the input of the user, the first code stored in the first output buffer into the second code for storing in the second output buffer; and submit, in response to storing the second code in the second output buffer, the payment by transmitting the second code to a point of sale (POS) device in the second transmission mode.

10. The mobile device of claim 9, wherein the plug-in software module comprises:

a decoder configured to decode the first code in a first encoding format to generate an extracted payment account number; and an encoder configured to encode the extracted payment account number using a second encoding format of the second code.

11. The mobile device of claim 9, wherein the plug-in software module comprises:

a codec configured to convert the payment account number from a first encoding format of the first code directly into a second encoding format of the second code.

12. The mobile device of claim 9, wherein the digital wallet application is further configured to receive an indication whether the POS device is compatible with the first transmission mode, and wherein the plug-in module is further configured to receive, from the digital wallet application when the indication indicates that the POS device is incompatible with the first transmission mode, an address in the first output buffer to obtain the first code.

13. The mobile device of claim 9, further comprising a display screen configured to display a bar code to transmit the second code to the POS device in the second transmission mode, wherein the first code comprises one of an audio tone representation of the payment account number and a near field communication representation of the payment account number.

14. The mobile device of claim 9, further comprising a audio transducer configured to generate an audio tone representation of a bar code to transmit the second code to the POS device in the second transmission mode, wherein the first code comprises one of the bar code and a near field communication representation of the payment account number.

15. The mobile device of claim 9, further comprising a near field communication (NFC) transducer configured to generate an NFC representation of a bar code to transmit the second code to the POS device in the second transmission mode, wherein the first code comprises one of the bar code and an audio tone representation of the payment account number.

16. The mobile device of claim 9, wherein the mobile device is a smartphone.

17. A non-transitory computer readable medium storing instructions to submit a payment, the instructions when executed by a computer comprising functionality for:

receiving, from a user of the mobile device, input to change a first code to a second code, wherein the first code comprises a payment account number stored in the mobile device;

obtaining, in response to the input of the user, the first code from a first output buffer of the mobile device, wherein the first output buffer stores data for transmission in a first transmission mode;

converting the first code stored in the first output buffer into the second code;

storing the second code in a second output buffer of the mobile device, wherein the second output buffer stores data for transmission in a second transmission mode; and transmitting, in response to storing the second code in the second output buffer, the second code to the POS device in the second transmission mode, wherein the payment account number is extracted from the second code by the POS device for completing the payment;

retrieving, by a digital wallet application executing on the processor, the payment account number from a repository of the mobile device for converting to the first code, wherein transmission capability of the digital wallet application for submitting the payment is limited to transmitting the first code in the first transmission mode, wherein the second code is stored in the second output buffer and transmitted to the POS device in response to a plug-in module converting the first code into the second code.

18. The non-transitory computer readable medium of claim 17, wherein converting the first code into the second code comprises:

decoding the first code in a first encoding format to generate an extracted payment account number; and encoding the extracted payment account number using a second encoding format of the second code.

19. The non-transitory computer readable medium of claim 17, wherein converting the first code into the second code comprises:

converting the payment account number from a first encoding format of the first code directly into a second encoding format of the second code.

20. The non-transitory computer readable medium of claim 17, the instruction when executed by the processor further comprising functionality for:

receiving, by the digital wallet application, an indication whether the POS device is compatible with the first transmission mode; and receiving, by the plug-in module from the digital wallet application, an address in the first output buffer to obtain the first code when the indication indicates that the POS device is incompatible with the first transmission mode.

21. The non-transitory computer readable medium of claim 17, wherein transmitting the second code to the POS device in the second transmission mode comprises:

displaying the second code as a bar code on a display screen of the mobile device, wherein the first code comprises one of an audio tone representation of the payment account number and a near field communication representation of the payment account number.

22. The non-transitory computer readable medium of claim 17, wherein transmitting the second code to the POS device in the second transmission mode comprises:

transmitting the second code as an audio tone representation of a bar code using a audio transducer of the mobile device, wherein the first code comprises one of the bar code and a near field communication representation of the payment account number.

23. The non-transitory computer readable medium of claim 17, wherein transmitting the second code to the POS device in the second transmission mode comprises:

transmitting the second code as a near field communication (NFC) representation of a bar code using an NFC transducer of the mobile device, wherein the first code comprises one of the bar code and an audio tone representation of the payment account number.

24. The non-transitory computer readable medium of claim 17, wherein the mobile device is a smartphone.

* * * * *